United States Patent
Deng et al.

(10) Patent No.: US 9,762,704 B2
(45) Date of Patent: Sep. 12, 2017

(54) SERVICE BASED MEDIA PLAYER

(75) Inventors: Jing Deng, San Diego, CA (US); Max Wu, San Diego, CA (US); Rajesh Rao, San Marcos, CA (US); Fabio Hashimoto, San Diego, CA (US); Kenneth Westfield, San Diego, CA (US)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 13/104,457

(22) Filed: May 10, 2011

(65) Prior Publication Data

US 2012/0117262 A1 May 10, 2012

Related U.S. Application Data

(60) Provisional application No. 61/411,160, filed on Nov. 8, 2010.

(51) Int. Cl.
*G06F 15/16* (2006.01)
*H04L 29/06* (2006.01)

(52) U.S. Cl.
CPC .......... *H04L 69/18* (2013.01); *H04L 65/4084* (2013.01); *H04L 65/80* (2013.01)

(58) Field of Classification Search
USPC ................ 709/223, 224, 230, 203, 219, 231
See application file for complete search history.

(56) References Cited

U.S. PATENT DOCUMENTS

| | | |
|---|---|---|
| 6,324,542 B1 | 11/2001 | Wright, Jr. et al. |
| 6,336,137 B1 | 1/2002 | Lee et al. |
| 6,529,936 B1 | 3/2003 | Mayo et al. |
| 6,806,825 B2 | 10/2004 | Andrusiak et al. |
| 7,024,473 B2 | 4/2006 | Parent |
| 7,061,928 B2 | 6/2006 | Giroti et al. |
| 2006/0023595 A1 | 2/2006 | Erickson et al. |
| 2008/0133715 A1* | 6/2008 | Yoneda et al. ................ 709/219 |
| 2008/0189355 A1* | 8/2008 | Mahajan et al. .............. 709/203 |
| 2009/0193100 A1* | 7/2009 | Moradi et al. ................ 709/219 |
| 2010/0011028 A1* | 1/2010 | Dade ............................ 707/200 |
| 2010/0111497 A1 | 5/2010 | Song et al. |
| 2010/0153999 A1* | 6/2010 | Yates ............................. 725/39 |
| 2011/0113379 A1* | 5/2011 | Doucet et al. ................ 715/838 |
| 2011/0119404 A1* | 5/2011 | Maes ............................ 709/249 |
| 2013/0169741 A1* | 7/2013 | Witt et al. ................. 348/14.07 |

\* cited by examiner

*Primary Examiner* — Jason Recek
(74) *Attorney, Agent, or Firm* — Fitch, Even, Tabin & Flannery LLP

(57) ABSTRACT

A method and system are provided for simultaneously coupling to a plurality of client applications, receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol and executing the first playback request and the second playback request by one or more players implemented in a single protocol.

20 Claims, 5 Drawing Sheets

| Command | Event | Note |
|---|---|---|
| Create <player_id> | | Create a playback section with ID |
| Open <player_id> <URL> | | Open a stream in a section with URL |
| Play <player_id> | | Play a stream |
| Seek <player_id> <seek_position> | | Seek in a stream |
| | <player_id> BIVL_EVENT_STATE <STATE_ENUM> | Report player status information to BIVL player |
| | <player_id> BIVL_EVENT_ERROR <ERROR_ENUM> | Report error information to BIVL player |
| Play* <file_name> | | Play a stream with location in <file_name> |
| Pause | | Pause current playback |
| Stop | | Stop current playback |
| Play alarm <loop_flag> <alarm_file_path> | | Play internal alarm defined in <alarm_file_playback> |

*FIG. 3*

SERVICE BASED MEDIA PLAYER

This application claims the benefit of U.S. Provisional Application No. 61/411,160, filed Nov. 8, 2010, entitled "A Service Based Media Player Module on SONY Dash Device", which is incorporated in its entirety herein by reference.

BACKGROUND OF THE INVENTION

A media player is a consumer electronics device that is capable of storing and playing digital media such as audio, images, video, documents, etc. The data is typically stored on a hard drive, microdrive, or flash memory. Present day media players may further comprise Internet functionality and provide services to the user based on content available over the Internet.

SUMMARY OF THE INVENTION

Several embodiments of the invention provide a method comprising simultaneously coupling to a plurality of client applications, receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol and executing the first playback request and the second playback request by one or more players implemented in a single protocol.

In another embodiment, the invention provides a system comprising a plurality of client applications at a processor-based device and a media manager at the processor-based device simultaneously coupled to the plurality of client applications, comprising one or more players implemented in a first protocol and a player service module in communication with the one or more players and the plurality of client applications and configured to receive a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol and send a first command set to the one or more players for executing the first playback request and a second command set to the one or more players for executing the second playback request.

In a further embodiment, the invention may be characterized as a tangible non-transitory computer readable medium storing one or more computer readable programs adapted to cause a processor based system to execute steps comprising simultaneously coupling to a plurality of client applications, receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol and executing the first playback request and the second playback request by one or more players implemented in a single protocol.

In yet another embodiment, the invention may be characterized as a system comprising a playback server in communication with at least two client applications, configured to receive requests from each of the at least two client applications, wherein the requests from each of the at least two client applications is implemented in a protocol that is different from the protocol of the other one of the at least two client applications, the playback server further configured to perform playback functions corresponding to each of the requests using the same set of players implemented in a single protocol and to send a status message implemented in the protocol corresponding to each of the at least two client applications regarding a status of the requests received from the at least two client applications.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 is a table of sample message formats for the protocol between player service and Sony BIVL player.

Figure 1:
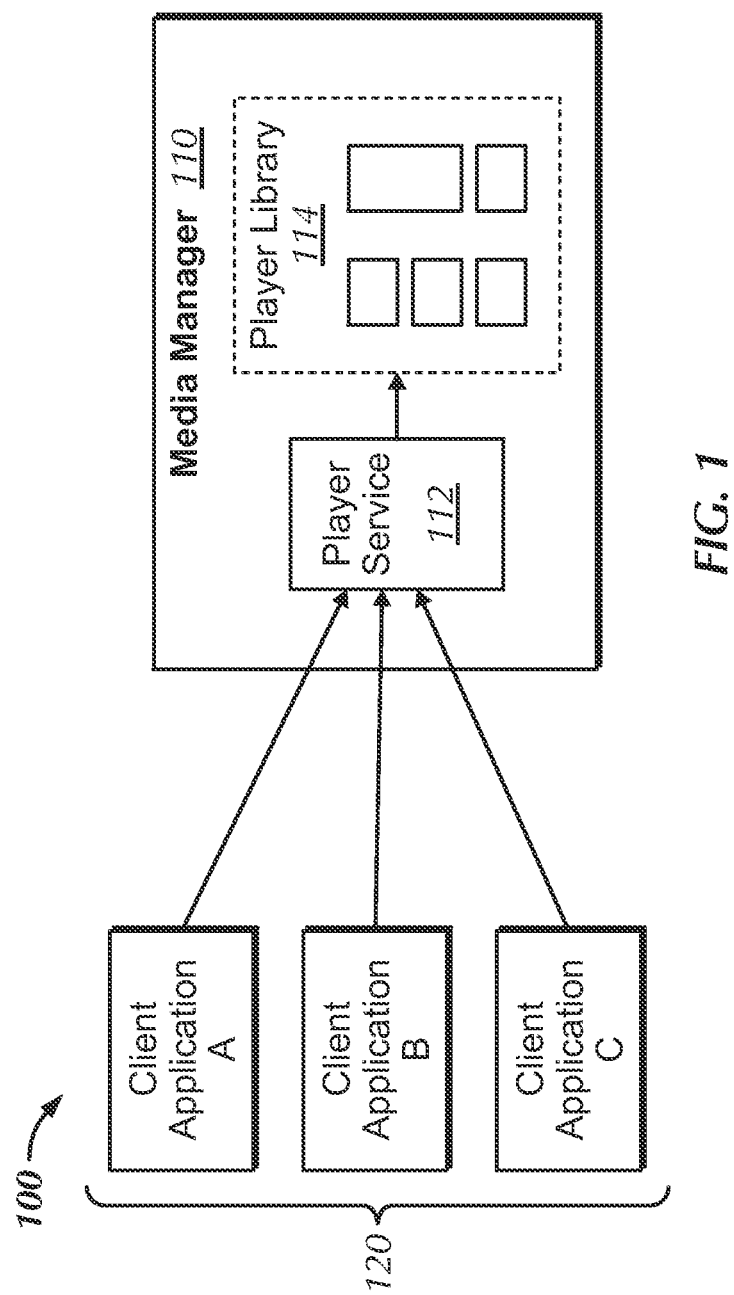
FIG. 1 is a block diagram of a system implemented within a media player device for implementing the methods and techniques of the present invention, according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

The present invention provides a media player device that provides the user with access to multiple networking-based features, such as alarm clock, Internet video, Internet radios, widgets, and other networking-based features. According to several embodiments, the media player device may comprise consumer electronic devices such as a TV, computer, tablet, mobile device, game console, DVD/Blue ray player, SONY Dash device, etc. In one embodiment, to facilitate access to the one or more networking-based features the media player device is configured to support one or more third party media applications (referred to throughout as the media applications) associated with the one or more networking-based features. In one embodiment, each of these media applications is developed by an independent third party and supports different APIs and/or is implemented in different programming languages. Thus the present media player device provides a system for supporting playback functions for multiple media applications implemented in different programming languages and/or using different APIs.

Referring to FIG. 1, a block diagram of a system 100 implemented within the media player device for implementing the methods and techniques of the present invention is illustrated, according to several embodiments of the present invention.

According to several embodiments, the system 100 comprises a service-based player module referred to herein as the media manager 110. In one embodiment, the media manager comprises a player service 112 as well as a player library 114 comprising a plurality of players. According to several embodiments, the system 100 further comprises a plurality of one or more third party software applications (referred to throughout as client applications 120) associated with the one or more networking-based features provided to the media player device user.

In one embodiment, the media manager 110 is configured to provide playback service to one or more client applications 120 associated with the one or more networking-based features provided to the media player device user. In one or more embodiments, media manager 110 provides support to different multimedia playback functions for the one or more client applications 120, wherein each of these client applications uses different APIs and/or is implemented in different programming languages.

In several embodiments, instead of working as a library, the media manager itself works as a server, which provides the playback service to the one or more client applications. In such embodiments, the client applications 120 are developed as the media manager's clients. The client applications 120 send playback requests to the server, i.e. the media manager 110, and the media manager 110 may respond to the client applications with events for the playback status. This client-server based architecture provides loose coupling between media manager and its client applications.

According to several embodiments, as shown in FIG. 1, a plurality of client applications, e.g. client applications A, B and C, are communicatively coupled to the media manager 110 simultaneously and the media manager provides playback functionality for each of the these client applications. According to several embodiments, each client application is dependently communicatively coupled to the media manager 110 without knowledge of the other ones of client applications. In one or more embodiments, simultaneous support of these client applications is facilitated by message based communication. That is, in several embodiments, the communication between media manager 110 and client applications 120 is through messages.

The player service 112, according to embodiments of the present invention, functions as the top layer of media manager 110. In one embodiment, the player service 112 performs two main functions. One is to manage the communication between client applications 120 and media manager 110, the other is to maintain the internal state of media manager.

According to several embodiments, the player service 112 supports the communications between media manager 110 and client applications 120 and maintains the internal state of media manager 110. According to one embodiment, the media manager 110 facilitates for multiple client applications, wherein each client application uses a different application specific protocol to communicate with the media manager 110 and the player service 112. Player service 112 handles all client applications, such that the clients are not aware that the media manager 110 is supporting other client applications simultaneously.

As described above, in several embodiments, the communication between media manager and client applications are through messages. The player service 112, according to several embodiments, comprises a message based protocol API, which defines the format of messages for playback controls, like play, stop, pause, seek, volume setting, mute, video scaling, etc. According to several embodiments, to provide simultaneous support to client applications 120, the player service 112 provides different application specific protocols for each client application. This approach requires player service to handle different application specific protocols, but it dramatically reduced the porting workload on the client applications 120 as well as the players within player library 114. According to several embodiments, the player service 112 uses named pipes to communicate with each client application, parses the messages from each client application and executes the commands corresponding to the message.

The player service 112, according to one embodiment, maintains an internal state machine to sync the playback status of the players within player library 114, and client applications 120. The state machine is configured to provide the player service a detailed status of each player within player library 114.

In several embodiments, the player service is designed to be essentially independent from low-level implementation details, e.g. codec driver engine details, code driver APIs, etc., and the playback controls are implemented in the players within the player library 114. The player service 112 thus provides playback functionality to client applications 120 while encapsulating the low layer implementation details of the media manager 110. Thus, in several embodiments, when the low layer implementation details, e.g. codec drivers, are upgrade or changed, the system can function without change.

The media manager 110 further comprises a player library 114 comprising a plurality of players. Each player within the player library 114 is responsible for a particular multimedia playback function. According to several embodiments, the players of player library 114 are controlled by the player service 112 to provide integrated multimedia playback functions to the client applications 120. In several embodiments, the players are configured to implement codec driver engine related playback control functions using codec engine APIs.

The media manager 110 may use one or more existing codec engines to provide the multimedia functions such as http and local video/audio file playback, PCM audio data mixing, and audio capturing. For example, in one embodiment, the media manager 110 uses the codec engine EMX8652 from Sigma designs. Sigma's codec engine uses hardware decoding, supports http and local video/audio file playback, PCM audio data mixing, and audio capturing. In one embodiment the codec engine is designed to allow users to instantiate and run codecs. It provides an API to facilitate interactions with these codecs. The codec engine further allows custom system programming interfaces to handle new classes of algorithms, functions and protocols. According to one embodiment, to provide the player service 112 with independence from low level implementation details, the players of player library 114 comprise adapters—extra layer of code—that fits between the codec engine and the algorithms. Its purpose is to adapt the interface exposed by the algorithm so that it better conforms to the customize system programming interface of the media manager 110.

According to several embodiments, the media manager 110 provides multiple programming language support, fault tolerance, extensibility and portability. The client application software can be written in different programming languages because the communication between media manager and its client applications are through messages. Additionally, the media manager allows client applications to run multiple processes and thus is able to tolerate client application crashes. For example, when a client application crashes, the media manager is ready to accept a new message from the restarted client application. Furthermore, since media manager's API is message based and the implementation is encapsulated, the integration is quick and the needed modifications are minimal at the media manager side. Still further, since media manager encapsulates its implementation, the media manager can be easily ported on other platforms, and continue to provide service to the same applications, while the underline codec drivers may be different for each platform.

Figure 2:
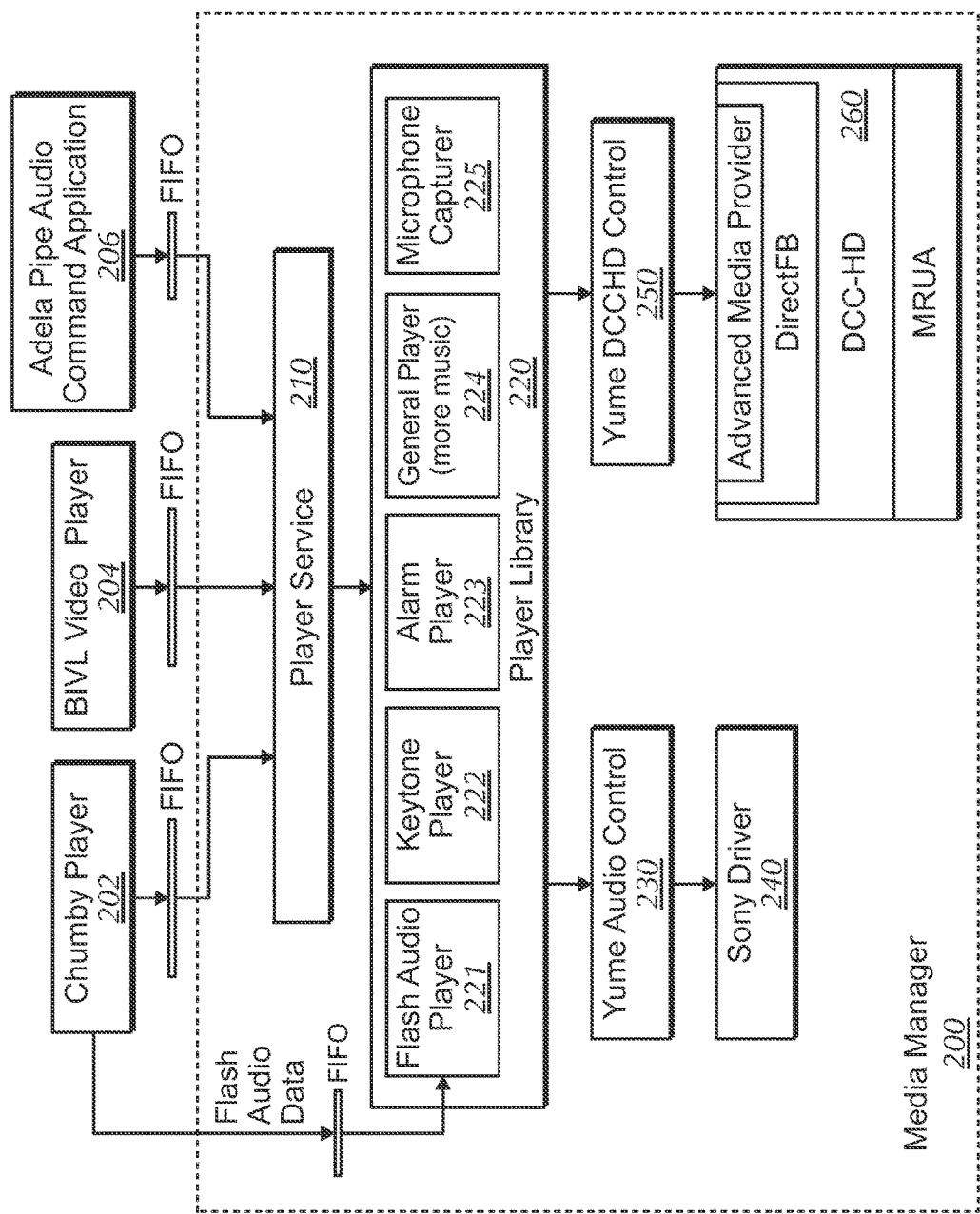
FIG. 2 is a block diagram of an exemplary media manager, according to several embodiments of the present invention.

FIG. 2 illustrates a block diagram of an exemplary media manager according to several embodiments of the present invention.

The media manager 200 supports three client applications: Chumby flash player 202, Sony BIVL player 204, and Adela audio command application 206. The communication between media manager 200 and Chumby flash player 202, Sony BIVL player 204, and Adela audio command application 206 is through messages.

The top layer of the media manager 200 is player service 210. As described above, the player service 210 performs two primary functions. One is to manage the communication between Chumby flash player 202, Sony BIVL player 204, and Adela audio command application 206 and the media manager 200, the other is to maintain the internal state of the media manager 200.

The API of the player service 210 is a message based protocol, which defines format of message for playback controls, like play, stop, pause, seek, volume setting, mute, video scaling, etc. According to several embodiments, the player service 210 provides different application specific protocols for its different client applications, e.g. the Chumby flash player 202, Sony BIVL player 204, and Adela audio command application 206. For example, the protocol for the Sony BIVL player 204 is different from the protocol for Chumby flash player 202. FIG. 3 illustrates sample message formats for the protocol between the player service 210 and the Sony BIVL player 204.

The media manager 200 contains a player library 220 with five players: a Flash Audio Player 221, a Key Tone Player 222, an Alarm Player 223, a General Player (Movie Player) 224 and a Microphone Capturer 225, controlled by the player service 210. Each player 221, 222, 223, 224, 225 is responsible for a particular multimedia playback function. According to one embodiment, these players 221, 222, 223, 224, 225 are configured to function as the adapters of the codec software API, and they are controlled by the player service 210 to provide integrated multimedia functions.

The flash audio player 221, for example, renders and mixes the audio output of Chumby flash players 202 to speakers of the media player device. In one embodiment the flash audio player 221 builds a named pipe to receive the audio output from Chumby flash player 202, and renders the data to one of the audio mixing channel of Sigma's codec.

In some embodiments, the key tone player 222 plays key tone sounds and the alarm player 223 is responsible for playing internal alarm sounds. These two players 222 and 223 play local PCM format of audio files. To provide for an optimal hearing effect, instead of sending file URL to the codec engine, in some embodiments, the key tone player 222 and the alarm player 223 use the data buffering mechanism of Sigma's codec, and dump audio data to the codec driver directly.

The general player 224 is responsible for all video and audio stream playbacks. The source of the video and audio can either come from a network stream or a local file at the media player device. In one embodiment, for example, the general player 224 controls all BIVL playback and live audio streaming playback.

The microphone capturer 225 is used to capture microphone input, and renders data to a local file.

According to embodiments of the present invention, the media manager 200 uses a codec engine to provide multimedia playback functionality. For example, according to the exemplary embodiment of FIG. 2, the media manager 200 uses the codec engine EMX8652 from Sigma designs. Sigma's codec engine uses hardware decoding, supports http and local video/audio file playback, PCM audio data mixing, and audio capturing. In one embodiment the codec engine is designed to allow users to instantiate and run codecs. In some embodiments, the codec engine provides an API to facilitate interactions with these codecs. The codec engine further allows custom system programming interfaces to handle new classes of algorithms. To provide platform independence to the player service 210 the players comprise adapters—extra layer of code—that fits between the Codec Engine Runtime and the algorithm. Its purpose is to adapt the interface exposed by the algorithm so that it better conforms to the customize system programming interface of the media manager 200.

In one embodiment players 221-225 function as adapters between Sigma driver's API and player service 210. In one embodiment, the players 221-225 use the Sigma DCCHD API, mainly its Advanced Media Playback API. The players 221-225, according to this exemplary embodiment, comprise adapters of Sigma's codec software API to provide integrated multimedia functions.

As shown in FIG. 2, the player library 220 comprises low level player adapters Yume Audio Control (YAC) 230, Sony Driver 240, and Yume DCCHD Control (YDC) 250.

YAC 230 is configured to control audio post processing settings such as mute, volume control, audio filter settings, audio DAC channel swap feature and headphone detection. This module is in charge to provide all audio API's to upper layers modules of the media player device. Sony Driver 240 handles the low level communication with a low-power stereo audio codec, e.g. TL V320AIC31 04 chip from Texas Instruments, which comprises a stereo headphone amplifier, as well as multiple inputs and output that are programmable in single ended or fully differential configurations.

YDC 250 is a module configured to allocate the graphics layers for client applications and middleware, and further configured to allocate channels for each audio mixing source. YDC is an adapter on top of Sigma's DCCHD module 260. Sigma's codec/graphics driver supports five graphics layers. In one embodiment, the video playback output only uses the main video layer.

In further embodiments, to a provide reliable network connection, and collection of data transition information, like media stream bit rate, the codec engine http client library may further be replaced with a custom library, e.g. Sony http cache library. In one embodiment the custom library provides internal caching, bit rate measurement, network connection detection, reconnection, and error reporting mechanisms. The custom library may further support a live radio streaming function to play internet radio stations by capturing the radio metadata for the parsing.

Figure 4:
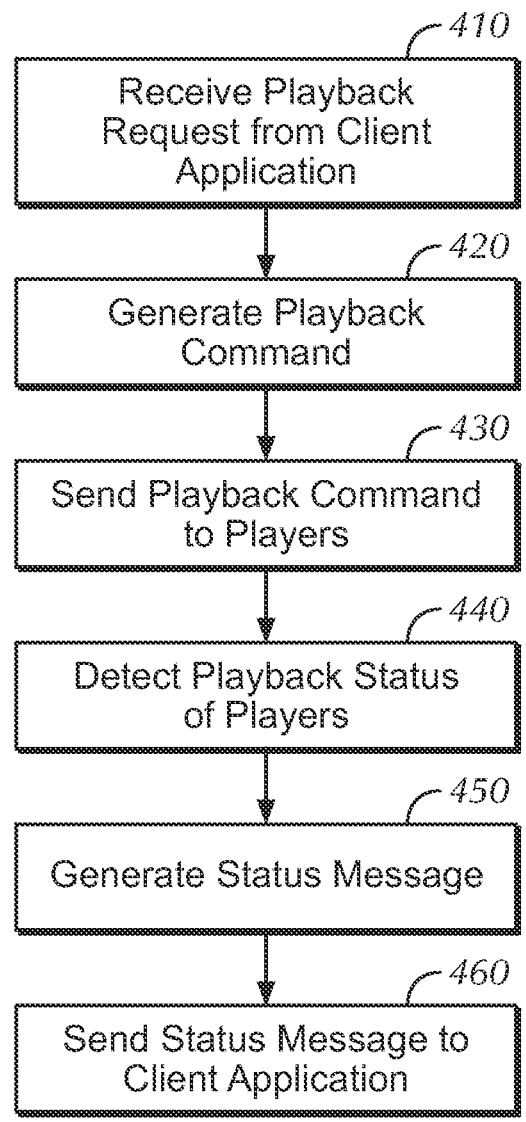
FIG. 4 is a flow diagram of a method for providing multi-media functionality to one or more client applications, according to several embodiments of the present invention.

Next referring to FIG. 4, a flow diagram of a method for providing multi-media functionality to one or more client applications is illustrated, according to one or more embodiments of the present invention.

First, in step 410 the media manager receives a playback request from a first client application 120. As described above, the communication between the one or more client applications 120 and the media manager 110 is facilitated by the player service 112. In one embodiment, each client application uses a different application specific protocol to communicate with the media manager 110 and the player service 112. The player service 112 handles all client applications, such that the client applications are not aware that the media manager 110 is supporting other client applications simultaneously.

The player service 112, according to several embodiments, comprises a message based protocol API, which defines the format of messages for playback controls, like play, stop, pause, seek, volume setting, mute, video scaling, etc. According to several embodiments, to provide simultaneous support to client applications 120, the player service 112 provides different application specific protocols for each client application. For example, the protocol for Sony BIVL player 204 is different from the protocol for Chumby flash player 202. FIG. 3 illustrates sample message formats for the protocol between the player service 112 and the Sony BIVL player 204. This approach requires player service to handle different application specific protocols, but it dramatically reduced the porting workload on the client applications 120 as well as the players within the player library 114. According to several embodiments, the player service 112 uses named pipes to communicate with each client application.

Next, in step 420, the player service parses the playback request to generate a playback command to be sent to the players of player library 114, e.g. players 221-225. In one embodiment, the players are all implemented according to a single protocol. According to these embodiments, to facilitate platform specific communication with each client application, the player service is configured to receive messages from the client application and to translate the message to the protocol of the players within the player library 114. In one embodiment, the player service 112 has access to one or more look up tables specific to each of the client applications having a specific platform. In step 420, the player service upon identifying the client application access the lookup table for the specific client application and determines the one or more commands corresponding to the player request received from the client application, the commands being executable by the players of the player library 114.

Next, in step 430, the player service 112 sends the one or more commands to the players of the player library 114. In several embodiments, the player service 112 maintains an internal state machine configured to provide the player service 112 with a detailed status of each player within player library 114. Thus, upon the playback function being performed at the players of player library 114, the player service, in step 440 detects a status of the players performing the function.

In step 450, the player service generates a status message based on the detected status of the players. In one embodiment, the message is implemented in the application specific protocol of the specific client application. Finally, in step 460, the player service 112 sends the status message to the client application.

Figure 5:
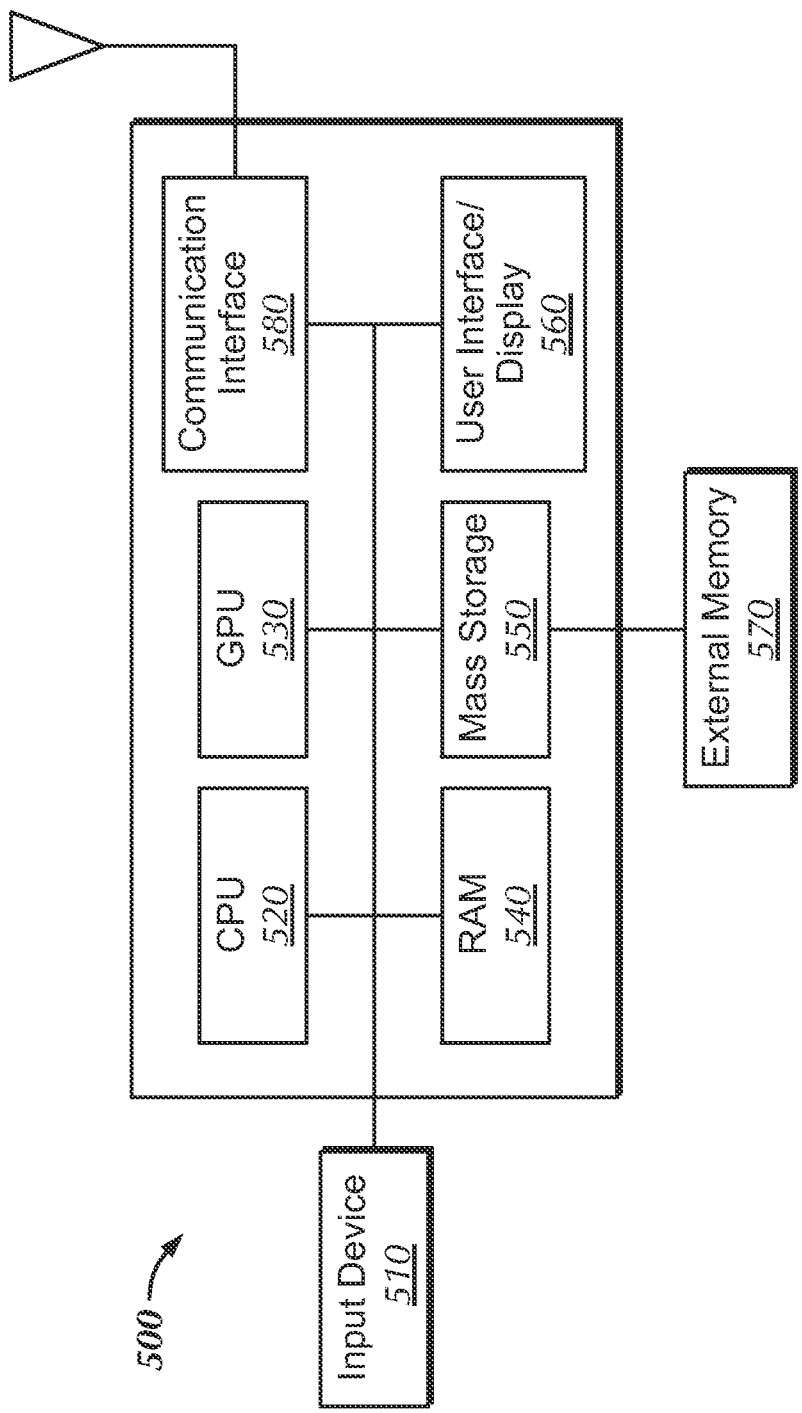
FIG. 5 is a block diagram illustrating a processor-based system that may be used to run, implement and/or execute the methods and/or techniques shown and described herein in accordance with embodiments of the present invention.

The methods and techniques described herein may be utilized, implemented and/or run on many different types of systems. Referring to FIG. 5, there is illustrated a system 500 that may be used for any such implementations. One or more components of the system 500 may be used for implementing any system or device mentioned above, such as for example any of the above-mentioned media player devices, client applications, servers, databases, players, etc. However, the use of the system 500 or any portion thereof is certainly not required.

By way of example, the system 500 may comprise an intermediary Processing Unit a User Input Device 510, (CPU) 520, a Graphic Processing Unit (GPU) 530, a Random Access Memory (RAM) 540, a mass storage 550, such as a disk drive, a user interface 560 such as a display, External Memory/Removable Storage Device 570, and Communication Interface 580. The CPU 520 and/or GPU 530 may be used to execute or assist in executing the steps of the methods and techniques described herein, and various program content, images, games, simulations, representations, communities, interfaces, etc. may be rendered on the user interface 560. The system 500 may further comprise a user input device 510. The user input device 510 may comprise any user input device such a keyboard, mouse, touch pad, game controller, etc. Furthermore, the system 500 may comprise a communication interface 580 such as a communication port for establishing a communication with one or more other processor-based systems and receiving one or more content. In one embodiment, the communication interface 580 may further comprise a transmitter for transmitting content, messages, or other types of data to one or more systems such as external devices, applications and/or servers. The system 500 comprises an example of a processor-based system.

The mass storage unit 550 may include or comprise any type of computer readable storage or recording medium or media. The computer readable storage or recording medium or media may be fixed in the mass storage unit 550, or the mass storage unit 550 may optionally include external memory and/or removable storage media 570, such as a digital video disk (DVD), Blu-ray disc, compact disk (CD), USB storage device, floppy disk, or other media. By way of example, the mass storage unit 550 may comprise a disk drive, a hard disk drive, flash memory device, USB storage device, Blu-ray disc drive, DVD drive, CD drive, floppy disk drive, etc. The mass storage unit 550 or external memory/removable storage media 570 may be used for storing code that implements the methods and techniques described herein.

Thus, external memory and/or removable storage media 570 may optionally be used with the mass storage unit 550, which may be used for storing code that implements the methods and techniques described herein, such as code for generating and storing the tag data described above, performing the initiation of a session, evaluating, and matching of the users. However, any of the storage devices, such as the RAM 540 or mass storage unit 550, may be used for storing such code. For example, any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM 540, mass storage unit 550 and/or external memory/removable storage device 570, may be used for storing any needed database(s), tables, content, etc.

In some embodiments, one or more of the embodiments, methods, approaches, and/or techniques described above may be implemented in a computer program executable by a processor-based system. By way of example, such processor based system may comprise the processor based system 500, or a television, mobile device, tablet computing device, computer, computing system, entertainment system, game console, graphics workstation, etc. Such computer program may be used for executing various steps and/or features of the above-described methods and/or techniques. That is, the computer program may be adapted to cause or configure a processor-based system to execute and achieve the functions described above.

As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computing system and a computer program embodied in the medium for causing the computing system to perform or execute steps comprising any one or more of the steps involved in any one or more of the embodiments, methods, approaches, and/or techniques described herein.

For example, in some embodiments the present invention provides a computer-readable storage medium storing a computer program for use with a computer simulation, the computer program adapted to cause a processor based system to execute steps comprising simultaneously coupling to a plurality of client applications, receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol and executing the first playback request and the second playback request by one or more players implemented in a single protocol.

In some embodiments, one or more of the embodiments, methods, approaches, and/or techniques described above may be implemented in a computer program executable by a processor-based system. By way of example, such processor based system may comprise the processor based system 500, or a computer, entertainment system, game console, graphics workstation, etc. Such computer program may be used for executing various steps and/or features of the above-described methods and/or techniques. That is, the computer program may be adapted to cause or configure a processor-based system to execute and achieve the functions described above. As another example, such computer program may be used for implementing any type of tool or similar utility that uses any one or more of the above described embodiments, methods, approaches, and/or techniques. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer-readable storage medium storing a computer program for use with a computer simulation, the computer program adapted to cause a processor based system to execute steps comprising simultaneously coupling to a plurality of client applications, receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol and executing the first playback request and the second playback request by one or more players implemented in a single protocol.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
   simultaneously coupling to a plurality of client applications on a processer-based device;
   receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol; and
   executing, on the processor-based device, the first playback request and the second playback request by one or more players implemented in a single protocol;
   wherein the processor-based device comprises a media player device for playing at least one of video and audio to a user in response to a playback request;
   wherein the first client application and the second client application are clients to a media manager running on the processor-based device in a client-server based architecture;
   wherein the media manager, the first client application, and the second client application are each running on the media player device; and
   wherein each of the plurality of client applications is associated with one or more networking-based features provided to the user at the media player device.

2. The method of claim 1 further comprising:
   sending a status message to each of the first client application and the second client application, wherein the status message for the first client application is implemented in the first application specific protocol, and the status message for the second client application is implemented in the second application specific protocol.

3. The method of claim 2, further comprising:
   detecting a status of the one or more players in response to executing the first playback request and generating the status message for the first client application and detecting the status of the one or more players in response to executing the second playback request and generating the status message for the second client application.

4. The method of claim 1, wherein executing the first playback request and the second playback request comprises:
   parsing the first playback request and generating a first command set to perform a function associated with the first playback request and parsing the second playback request and generating a second command set to perform a function associated with the second playback request; and
   sending the first command set and the second command set to the one or more players; and
   executing the first command set and the second command set at the at least a first one of the one or more players.

5. The method of claim 4, wherein generating the first command set and the second command set comprises looking up the first playback request and the second playback request in a lookup table and determining a corresponding first command set and the second command set in response to the looking up.

6. The method of claim 1, wherein each of the one or more players is configured to perform a specific set of playback functions.

7. The method of claim 6, wherein executing the first playback request comprises determining a function corresponding to the first playback request and executing the function at the one or more players configured to perform the function; and
   wherein executing the second playback request comprises determining a function corresponding to the second playback request and executing the function at the one or more players configured to perform the function.

8. The method of claim 1, wherein the executing the first playback request and the second playback request from each of the first client application and the second client application is performed simultaneously.

9. The method of claim 1, further comprising:
   detecting each of the plurality of client applications; and
   establishing a separate communication pipe for each of the plurality of client applications.

10. A system comprising:
    a plurality of client applications at a processor-based device; and
    a media manager at the processor-based device simultaneously coupled to the plurality of client applications, comprising:
       one or more players implemented in a first protocol; and
       a player service module in communication with the one or more players and the plurality of client applications and configured to:
          receive a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol; and
          send a first command set to the one or more players for executing the first playback request and a second command set to the one or more players for executing the second playback request;
    wherein the processor-based device comprises a media player device for playing at least one of video and audio to a user in response to a playback request;
    wherein the first client application and the second client application are clients to the media manager in a client-server based architecture;
    wherein the media manager, the first client application, and the second client application are each running on the media player device; and
    wherein each of the plurality of client applications is associated with one or more networking-based features provided to the user at the media player device.

11. The system of claim 10, wherein the player service module is further configured to send a status message to each of the first client application and the second client application, wherein the status message for the first client application is implemented in the first protocol, and the status message for the second client application is implemented in the second application specific protocol.

12. The system of claim 11, wherein sending the status message comprises:
   detecting a status of the one or more players in response to executing the first playback request and generating the status message for the first client application and detecting the status of the one or more players in response to executing the second playback request and generating the status message for the second client application.

13. The system of claim 10, wherein executing the first playback request and the second playback request comprises:
   parsing the first playback request and generating the first command set to perform a function associated with the first playback request and parsing the second playback request and generating the second command set to perform a function associated with the second playback request; and
   sending the first command set and the second command set to the one or more players.

14. The system of claim 13, wherein generating the first command set and the second command set comprises looking up the first playback request and the second playback request in a lookup table and determining a corresponding first command set and the second command set in response to the looking up.

15. The system of claim 10, wherein the one or more players are configured to:
   execute the first command set and the second command set, wherein each of the one or more players is configured to perform a specific set of playback functions.

16. The system of claim 15, wherein executing the first playback request comprises determining a function corresponding to the first playback request and executing the function at the one or more players configured to perform the function; and
   wherein executing the second playback request comprises determining a function corresponding to the second playback request and executing the function at the one or more players configured to perform the function.

17. The system of claim 10, wherein the player service module is further configured to establish a communication with the plurality of client applications comprising:
   detecting each of the plurality of client applications; and
   establishing a separate communication pipe for each of the plurality of client applications.

18. The system of claim 10, wherein the player service module is configured to simultaneously perform the receiving and sending steps for the plurality of client applications.

19. A tangible non-transitory computer readable medium storing one or more computer readable programs adapted to cause a processor based system to execute steps comprising:
   simultaneously coupling to a plurality of client applications on the processor based system;
   receiving a first playback request from a first client application of the plurality of client applications, the first playback request being implemented in a first application specific protocol of the first client application, and a second playback request from a second client application of the plurality of client applications, the second playback request being implemented in a second application specific protocol of the second client application, wherein the first application specific protocol is different from the second application specific protocol; and
   executing, on the processor based system, the first playback request and the second playback request by one or more players implemented in a single protocol;
   wherein the processor based system comprises a media player device for playing at least one of video and audio to a user in response to a playback request;
   wherein the first client application and the second client application are clients to a media manager running on the processor-based system in a client-server based architecture;
   wherein the media manager, the first client application, and the second client application are each running on the media player device; and
   wherein each of the plurality of client applications is associated with one or more networking-based features provided to the user at the media player device.

20. A system comprising:
   a playback server in communication with at least two client applications on a processor based device, configured to receive requests from each of the at least two client applications, wherein the requests from each of the at least two client applications is implemented in a protocol that is different from the protocol of the other one of the at least two client applications;
   the playback server further configured to perform playback functions corresponding to each of the requests using the same set of players implemented in a single protocol; and
   to send a status message implemented in the protocol corresponding to each of the at least two client applications regarding a status of the requests received from the at least two client applications;
   wherein the processor based device comprises a media player device for playing at least one of video and audio to a user in response to a playback request;
   wherein the at least two client applications are clients to the playback server running on the processor-based device in a client-server based architecture;
   wherein the media manager, the first client application, and the second client application are each running on the media player device; and
   wherein each of the at least two client applications is associated with one or more networking-based features provided to the user at a user of the media player device.

* * * * *